United States Patent [19]

Ihlenfield

[11] 4,261,326
[45] Apr. 14, 1981

[54] HIGH-EFFICIENCY RECUPERATIVE FURNACE

[75] Inventor: Harry Ihlenfield, Strongsville, Ohio

[73] Assignee: Smith Jones, Inc., Minnetonka, Minn.

[21] Appl. No.: 155,679

[22] Filed: Jun. 2, 1980

Related U.S. Application Data

[63] Continuation of Ser. No. 933,818, Aug. 15, 1978, abandoned.

[51] Int. Cl.³ .................. F24H 3/02; F28F 27/02; F24D 5/00
[52] U.S. Cl. .................. 126/110 R; 126/99 D; 126/108; 165/97; 165/122; 165/173; 237/53
[58] Field of Search .......... 126/110 R, 110 B, 99 C, 126/110 D, 108, 99 D, 109, 99 A, 103; 165/70, 71, 97, 122, 137, 173; 237/53, 55, 11

[56] References Cited

U.S. PATENT DOCUMENTS

| | | | |
|---|---|---|---|
| 2,376,170 | 5/1945 | Mueller | 126/110 R |
| 2,376,171 | 5/1945 | Mueller | 126/110 R |
| 2,470,860 | 5/1949 | Parrish | 126/110 R |
| 2,496,505 | 2/1950 | Thompson | 126/110 R |
| 2,550,081 | 4/1951 | Nesbitt | 126/110 R |
| 2,751,900 | 6/1956 | Modine | 126/110 B |
| 2,808,047 | 10/1957 | Jaye et al. | 126/110 R |
| 3,294,082 | 12/1966 | Norris | 126/110 R |
| 3,650,262 | 3/1972 | Root et al. | 126/110 R |
| 4,003,407 | 1/1977 | Finger | 165/71 |
| 4,106,474 | 8/1978 | Hunter et al. | 126/110 R |

*Primary Examiner*—Daniel J. O'Connor
*Attorney, Agent, or Firm*—Oldham, Oldham, Hudak & Weber

[57] ABSTRACT

The invention relates to the conversion of a substantially conventional gas fired furnace utilizing two or more of the clam shell-type heat exchanger cells, which is modified by converting one cell to a final stage counterflow heat exchanger for the hot gases of combustion, which modification incorporates directing the gases of combustion from the fired cells in a counterflow path through the non-fired cell by utilizing a positive displacement fan and then exhausting the gases of combustion. The modification eliminates the need for positive venting, while substantially increasing the operational efficiency of the furnace unit. The normal flue gas temperature in this type of furnace will be about 450° F., while with the modification, the temperature will be reduced to less than about 200° F. and efficiency will be increased by greater than 10 percent.

6 Claims, 5 Drawing Figures

HIGH-EFFICIENCY RECUPERATIVE FURNACE

This is a continuation of application Ser. No. 933,818 filed Aug. 15, 1978 now abandoned.

BACKGROUND OF THE INVENTION

Heretofore, it has been known in the art to manufacture gas fired furnaces and heat exchangers utilizing stamped metal heat exchangers formed together in what has been commonly called, in the trade, a "clam shell" arrangement to create heat exchanger cells. These can be operated in either an upflow, a downflow, or a side flow arrangement, wherein hot gases of combustion are generated inside the clam shell, with the air or fluid medium to be heated being passed outside the clam shell so that heat exchange action takes place through the thin-walled, stamped metal of the cell. Typical of this type of furnace is one made by Tappan Air Conditioning and designated UG/UGI or the Janitrol Series 33 and 34 "Deluxe Upflow Furnace". These particular units utilize an aluminized/steel clam shell-type heat exchanger with a serpentine design for optimum efficiency of the stamped shell halves.

It is well known that this type of furnace design operates at about a 75 to 78 percent efficiency for conversion of the BTU energy of the input gas into heating capability for installation, the typical stack temperature at the immediate output of the heat exchangers is about 450° F., with this being diluted with room air to create a positive stack pressure so that at about two or three feet up, the stack temperature is about 350° F. In order to create a positive stack flow, a room air vent is conventional for this type of furnace.

The problem with this design is that nearly 25 percent of the potential energy of the gas is really lost as exhaust gases up the stack. In addition, the fact that these furnaces operate on the basis of positive venting which requires a room air vent (technically referred to as an "integral draft diverter") in association with the stack draws some of the heated room air up the stack, further decreasing the efficiency of the unit.

OBJECTS OF THE INVENTION

Therefore, it is the general object of the invention to avoid and overcome the deficiencies of the conventional forced air, gas or oil-fired furnace utilizing a positive vented stack by providing a modification to the furnace to affect recuperation, wherein the stack gases are directed from operating heat exchanger cells through a dead cell and a counterflow arrangement to reduce the temprature of the stack gases and extract more heat to the forced air around the heat exchangers, thus increasing the efficiency of the heat exchanger.

A further object of the invention is to eliminate the need for positive venting and the use of an integral draft diverter in connection with the stack by utilizing a fan to create a negative atmospheric pressure in the combustion chambers to draw the combustion gases through the dead cell. In this manner, a stack can actually be eliminated and the furnace can be vented in the same manner as a clothes dryer.

A further object of the invention is to provide for an improved forced air furnace which is applicable to any number of heat exchanger cells equal to or greater than two, and which modification can be made to existing forced air furnaces with minimum expense and great simplicity without changing the basic configuration of the furnace or heat exchanger components.

The aforesaid objects of the invention and other objects which will become apparent as the description proceeds are achieved by: a forced air heat exchanger system having at least two heat exchanger cells which includes means to provide hot gases of combustion through at least one of the cells and means to pass a fluid medium to be heated around all the cells, which is characterized by means to provide a flow path for the gases of combustion through the cell which is not fired, means to create a negative atmospheric pressure in the fired cell, and means to exhaust the combustion gases to the atmosphere after they have passed through the non-fired cell.

DESCRIPTION OF THE DRAWINGS

For a better understanding of the invention, reference should be made to the accompanying drawings, wherein.

DESCRIPTION OF THE PRIOR ART EMBODIMENT

Figure 1:
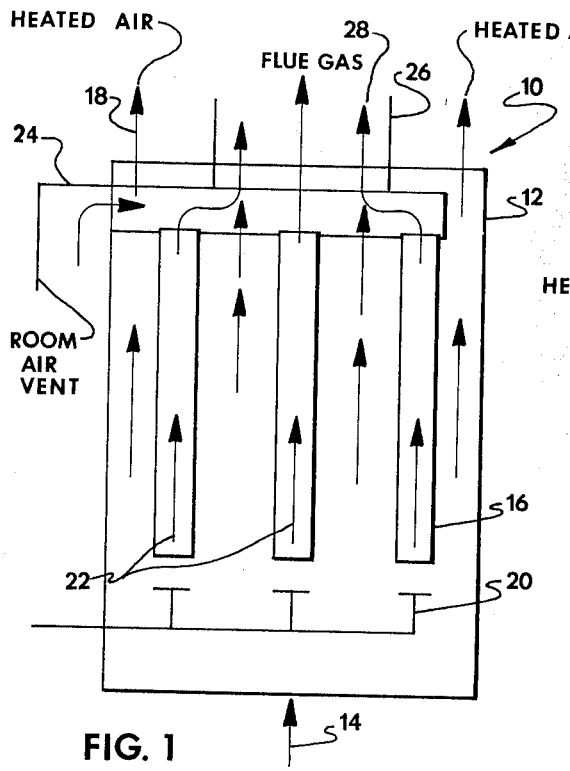
FIG. 1 is a schematic side elevation of a conventional forced air gas fired furnace or heat exchanger which utilizes the stamped clam shell-type heat exchanger substantially conventional in home furnace design.
Figure 2:
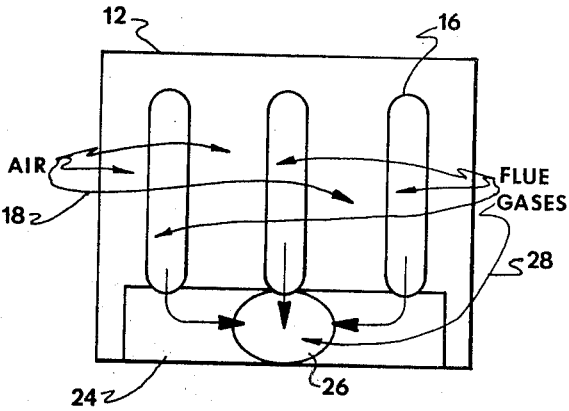
FIG. 2 is a top view of the conventional furnace of FIG. 1.

With reference to the prior art embodiment shown in FIGS. 1 and 2, the numeral 10 indicates the conventional home forced air heat exchanger which comprises an outer shell 12 through which air is forced by a blower (not shown) in a direction indicated by arrow 14 so that the air passes over and around heat exchanger cells 16, in the direction indicated by the many arrows designating heated air and indicated by numerals 18. The cells 16 are fixed by gas burners indicated generally by numeral 20 which create hot gases of combustion that pass up through the cells 16 as indicated by arrows 22 wherein, as the gases exit the cells into a flue collector box 23, they are combined with air passing through an integral draft diverter 24 to create a positive venting through a flue 26 where the combined flue gases and room air exhaust up through a chimney as indicated by the plurality of arrows 28. The integral draft diverter creates the positive venting in association with the stack 26 to draw the hot gases of combustion through the clam shell cells so that the heat exchange action takes place through the thin walls of the cells 16. Typically, the cells 16 are made as a metal stamping from aluminized steel. They are normally made in two shell halves which are seam-welded to form what has been commonly called the clam shell configuration, and may have some ribs or surface configuration that will provide strengthening action, as well as perhaps a better heat exchange transfer surface, and numerous designs have been proposed in that regard. The cells are normally bolted or welded in the housing 12 through which the air to be heated in the house is forced so that the burners 20 can direct the hot gases of combustion from gas or oil directly into the heat exchanger cells 16 to create optimum efficiency.

DESCRIPTION OF THE PREFERRED EMBODIMENT

Figure 3:
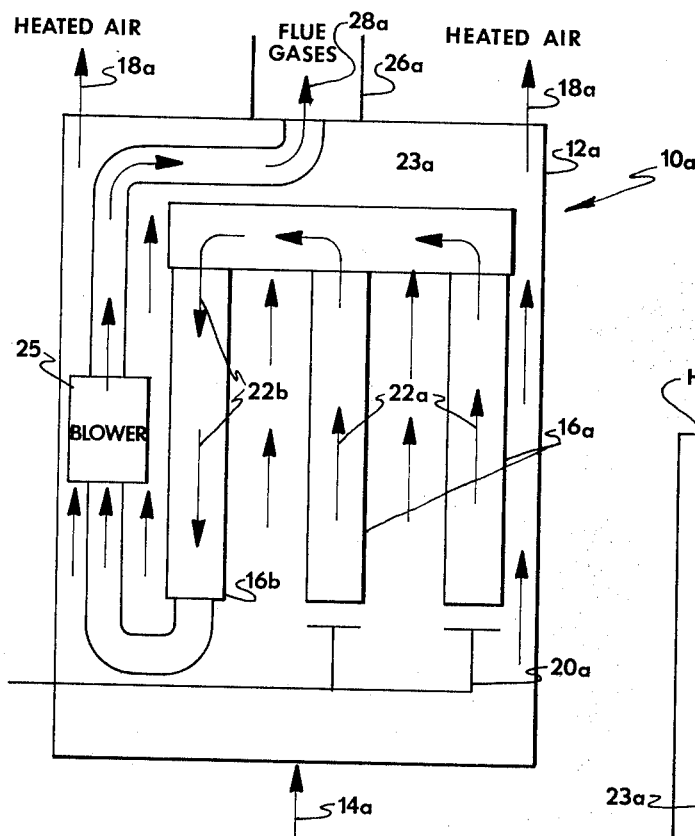
FIG. 3 is a schematic side elevational view of substantially the same furnace as FIG. 1, except with the modifications of the invention incorporated to achieve the improved energy efficiency.

The instant invention comprises a simple yet extremely valuable modification on the prior art embodiment of FIGS. 1 and 2. With reference to FIG. 3, similar numbers will be utilized with the suffix "a" added thereto so that the similarity in the two approaches will be readily discernible, which will also very clearly indicate the modifications. Particularly, the overall unit is designated by numeral 10a, with the outer shell or housing 12a having means (not shown) to force air 14a to be heated through the shell and around the heat exchanger cells 16a. Only the right two cells have been designated 16a, with the left cell, which is substantially the same in construction as the two right cells 16a, being designated by numral 16b; and, its modification will be described in more detail hereinafter. The heated air passing around the cells 16a and 16b passes out the top as indicated by numeral 18a. The hot gases of combustion are generated by burners 20a which are associated only with the right two cells 16a as indicated. The hot gases of combustion are indicated by arrows 22a and pass up through the cells 16a into the flue collector box 23a which collects the hot gases of combustion 22a and is modified from the version of FIG. 1 so as to direct the hot gases of combustion down through the cell 16b as indicated by the arrows 22b. This, of course, is a reverse flow to the direction of the heated air 18a as well as to the direction of the hot gases of combustion 22a. The flow of the combustion gases in this direction through cell 16b is achieved by providing a blower 25 which provides a slight negative atmospheric pressure in the flue collector box 23a and then ultimately carries the hot gases of combustion through the blower and into the flue gas exit 26a.

Hence, it will be understood that in this three-cell arrangement of FIG. 3, two cells are fired and one cell is not fired, but acts in a recuperative manner as a further heat exchanger by taking all of the hot gases of combustion from the two fired cells, directing them in a counterflow pattern and then exhausting them back to the vent stack as exhaust flue gases 28a. This procedure calls for a modification of the flue collector box 23a to close off the direct output to the flue gas stack 26a so that it, instead, directs these hot gases of combustion down through cell 16b with the movement of the flue gases assisted by the blower 25.

It has been recognized by those skilled in the art that the normal flue gas temperature of the flue gases 28 in FIG. 1 will be about 450° F. in the flue collector box 23, which when diluted with room air from the vent 24 will diminish to a temperatue of about 350° F., about two to three feet up the flue stack 26. In contrast, in FIG. 3, the flue gas temprtures will be about 450° F. in the flue collector box 23a, but will then diminish by further heat exchange action upon passing through cell 16b to about 200° F. at the oulet from cell 16b, and then to somewhat less than that at the entrance to the blower 25. It should further be noted that the modification to the flue collector box and the addition of the blower eliminate the need for the integral draft diverter 24. The art recognizes that the efficiency of the state of the art system of FIG. 1 is about 75 to 78 percent efficient when operating with natural gas. Tests have indicated that the modifications of FIG. 3 will increase the efficiency to between 85 to 87 percent.

Further, because the positive venting is achieved by the blower 25, it is unnecessary to incorporate a large masonary or metallic flue, because the temperatures in the flue gas have been significantly reduced, so that substantially the same type of venting as is present on gas or electric clothes dryers can be utilized with this furnace.

It is contemplated that the cells 16a will also be made from aluminized steel as in the FIG. 1 example; but, because there will be a substantial decrease in the temperature within cell 16b which may result in some condensation, it is preferred that the non-fired cell 16b be made of stainless steel, typically a type 321 stainless, so as to eliminate any potential corrosion problems. It is further desirable that a positive drain be provided at the bottom of cell 16b, which is shown and which will be described with respect to FIG. 5.

It should be recognized that the principle of the invention is applicable to any arrangement of more than one heat exchanger so that there will be at least one fired cell and one non-fired cell in a two cell arrangement, with three fired cells and one non-fired cell in a four cell arrangement, etc. It may be desirable, depending upon heat calculation needs, to go to more than one non-fired cell when the total number of fired cells exceeds four, but this will be well within the capabilities of one skilled in the art to determine, based on the principles set forth above.

The blower 25 will preferably utilize an aluminum or other non-corrosive-type blower wheel or fan to prevent corrosion, and it is anticipated that the actual size of the blower 25 is not critical since an orifice at the input to the blower can control the amount of air flow and vacuum drawn in the flue collector box.

Figure 4:
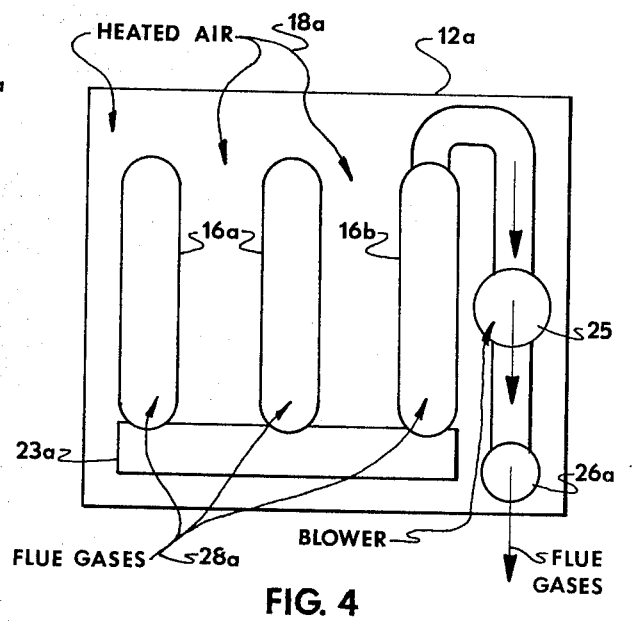
FIG. 4 is a top view of the furnace heat exchanger of FIG. 3.
Figure 5:
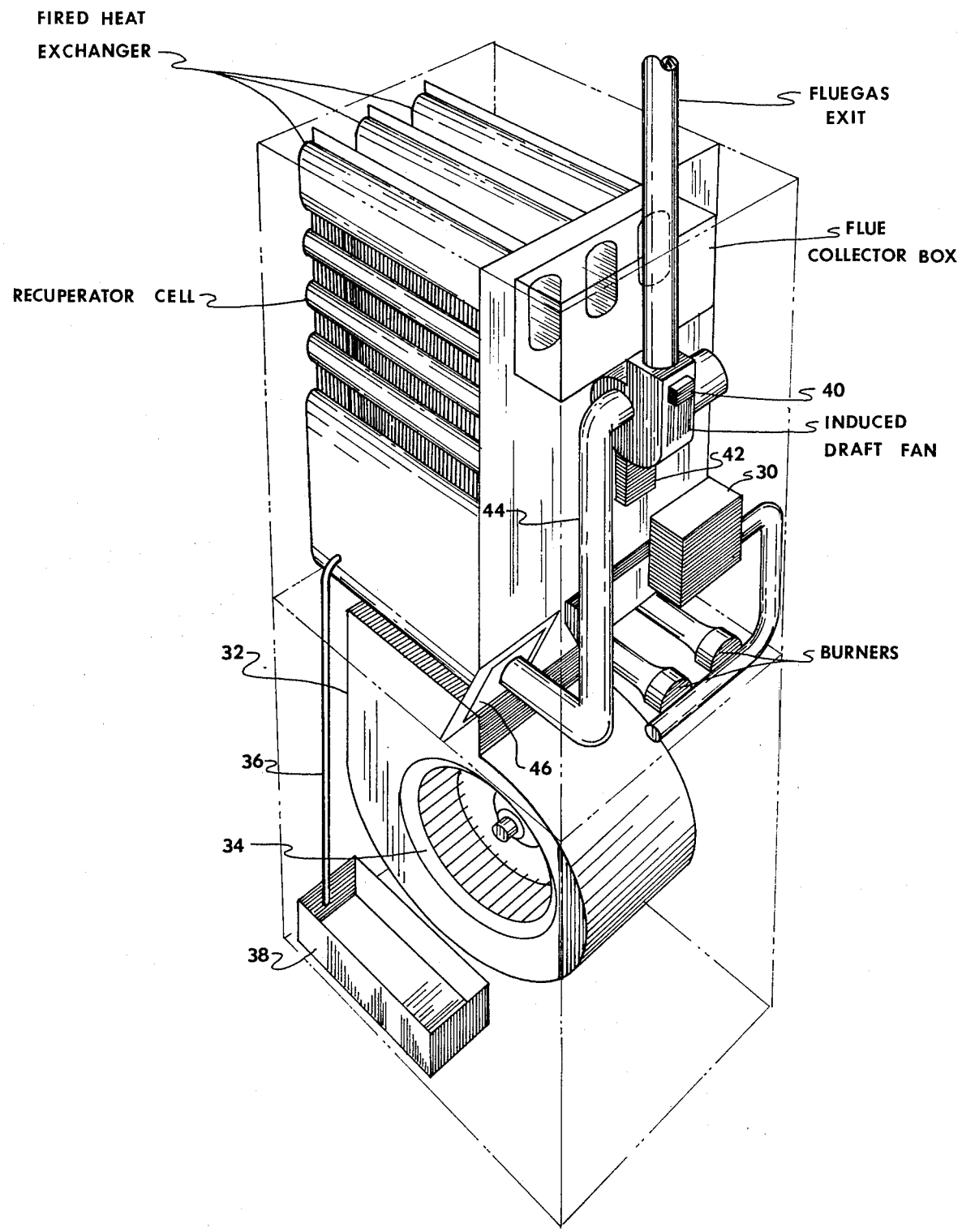
FIG. 5 is a three-dimensional perspective view of the overall furnace heat exchanger construction utilizing the modifications of the invention.

The perspective view of FIG. 5 illustrates a substantially complete furnace assembly which is clearly shown in broken-away perspective and readily illustrates the positioning of the basic elements shown in FIGS. 3 and 4. The common elements to FIGS. 3 and 4 are illustrated by the same numerals, but this drawing, showing a complete furnace, also includes a gas valve 30 which feeds the burners 20a. It further illustrates the circulation air blower 32, return air indicated by numeral 34, the condensate tube 36 coming from the base of cell 16b, and a condensate evaporator pan 38 into which the condensate drains. An air prover switch 40 will normally be associated with the induced draft fan or blower 25 to ensure that, in fact, the blower 25 is functioning before the burners 20a will be allowed to function. In that way, there can never be the danger that the furnace will function without a positive vent in the flue collector box. A conventional fan and limit switch 42 to prevent overheating of the furnace is also included.

It should be noted in FIG. 5 that a vent pipe 44, extending from the oulet of cell 16b, is in fact adapted to fit exactly into the normal burner opening of cell 16b, so that there really does not need to be any modification of the conventional fired cell as compared to the recuperator cell. This particular connection arrangement is identified in FIG. 5 as the recuperator flue gas exit to vent indicated by numral 46.

Hence, it should be understood that the objects of the invention are achieved by providing a recuperator cell for the flue gas counterflow in conjunction with fired cells in a conventional home furnace-fired heat exchanger, flue gas parallel flow arrangement. This is accomplished by modifying the flue collector box and utilizing an induced draft fan to effect a power vent to direct the flue gases from the fixed cells through the recuperator cell and, thence, out through the flue gas exit. The efficiency of the furnace has marketly increased. The need for positive venting is eliminated, and the introduction of room air to effect positive venting is eliminated. The entire arrangement can be done within exactly the same package as the home furnace arrangement, as currently manufactured, and the modifications are simple and quite inexpensive.

While in accordance with the patent statutes, only the preferred embodiment or the invention has been illustrated and described in detail, it is to be particularly understood that the invention is not limited thereto and thereby, but that the inventive scope is defined in the appended claims.

What is claimed is:

1. A forced air heat exchanger system for a gas fired central furnace having at least three similar gas fired clam-shell type heat exchanger cells having normally gas fired ends and exhaust gas ends arranged in side-by-side parallel gas flow relation within a confined housing which includes means to provide hot gases of combustion through at least two adjacent cells and means to pass a fluid medium to be heated around all the cells through the confined housing, which is characterized by:

a flue connector box integrally connected to the normally exhaust gas ends of the cells and being substantially perpendicular to the cells to provide a flow path for the gases of combustion exhausting from the fired cells into the normal exhaust gas end of the cell which is not fired, the non-fired cell being one of the outside cells in parallel relation;

means to create a negative atmospheric pressure at the exhaust end of the non-fired cell; and means to exhaust the combustion gases to the atmosphere after they have passed through and out the normally gas fired end of the non-fired cell.

2. A heat exchanger system according to claim 1, wherein the means to create the negative atmospheric pressure in the fired cell is a blower which effects suction action through the non-fired cell into the exhaust gas end of the fired cell.

3. A heat exchanger system according to claim 2, wherein fail-safe means are provided to determine that the blower to effect the negative atmospheric pressure in the fired cell is functioning before the hot gases of combustion are allowed to pass through any of the cells.

4. A heat exchanger system according to claim 1, where the hot gases in the fired cells flow in the same direction as the air moves around the cells, whereas the hot gases passed through the non-fired cell move in the opposite direction.

5. A heat exchanger according to claim 1, where the non-fired cell is made from a corrosion-resistant metallic material and includes means to remove condensate from within such cell.

6. A heat exchanger system according to claim 1, where the housing encases the entire heat exchanger ystem.

* * * * *